J. MORGAN.

Machine for Punching and Beveling Metal.

No. 8,251. Reissued May 28, 1878.

Witnesses

R. H. Whitelaw

C. L. Parker

Inventor James Morgan

By Attorney George H. Christy

UNITED STATES PATENT OFFICE.

JAMES MORGAN, OF PITTSBURG, PENNSYLVANIA.

IMPROVEMENT IN MACHINES FOR PUNCHING AND BEVELING METAL.

Specification forming part of Letters Patent No. 173,132, dated February 8, 1876; Reissue No. 8,251, dated May 28, 1878; application filed February 6, 1878.

*To all whom it may concern:*

Be it known that I, JAMES MORGAN, of Pittsburg, county of Allegheny, State of Pennsylvania, have invented or discovered a new and useful Improvement in Machines for Punching and Beveling Metal Plates; and I do hereby declare the following to be a full, clear, concise, and exact description thereof, reference being had to the accompanying drawing, making a part of this specification, in which like letters indicate like parts.

Figure 1:
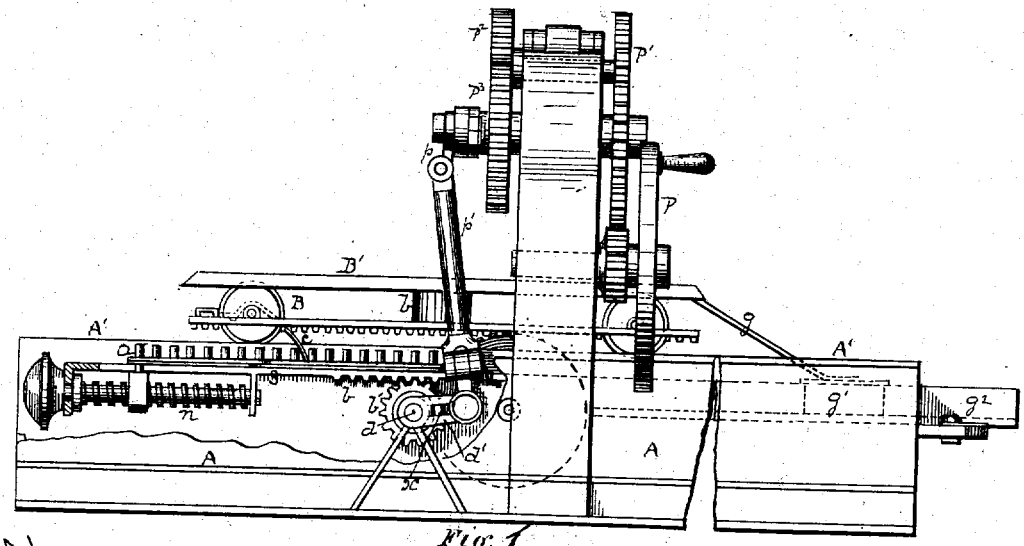
Figure 4:
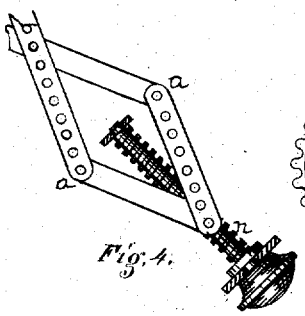
Figure 2:
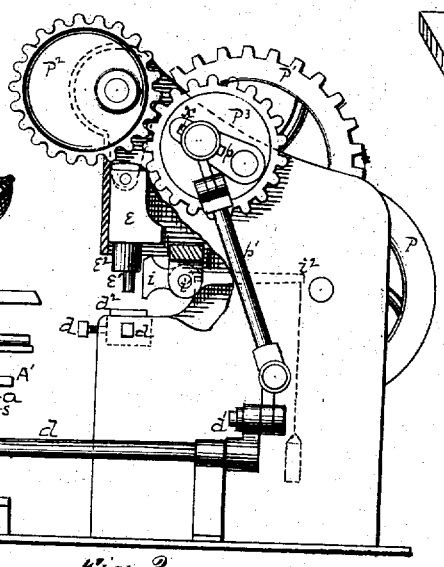
Figure 3:
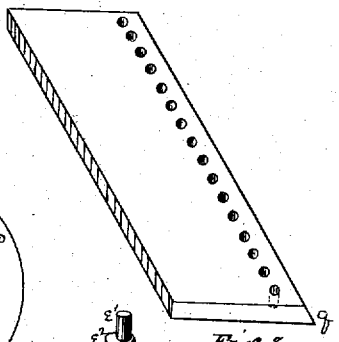
Figure 5:
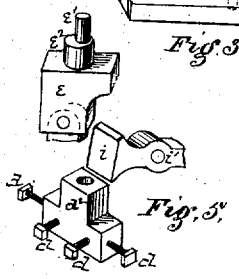

Figure 1 is a rear-side elevation of my improved machine, with a portion of the framework broken away the better to illustrate some of its features of construction. Fig. 2 is an end view thereof. Fig. 3 is a view, in perspective, of a portion of a plate as punched and sheared. Fig. 4 is a detached view, in perspective, of a portion of the extensible or adjustable rack-frame employed; and Fig. 5 is a detached view, showing, in perspective, the lower face of the punch-head and punch, the upper face of the die, and the end of the shear.

My present invention relates to certain improvements in the machine described in Letters Patent No. 167,461, granted to me September 7, 1875, by means of which a greater range of feed adjustment is secured; also, a better feeding motion; also, a trimming of the plate along its edge preparatory to calking at the same time that it is punched, and by the same operation; and also by means of which a better adjustment of the punch is effected with reference to the shear and die than has yet been attained.

The frame-work A, carrying the track-rails A′, is such as is in use in similar machines, as also the truck or carriage B and the feed-table B′, the latter being pivoted at its center by pin and socket *b*, and guided in giving other than a straight feed by a rigid arm, *g*, shoe *g*, playing in a U-shaped adjustable guide, $g^2$, all substantially as set forth in the patent above named.

The usual rack and pinion *h h′* are also employed to run the carriage back after the conclusion of each line of punching.

An extensible or adjustable rack, *a*, with a series of teeth or pins, to be engaged in succession by a pawl, *c*, is also employed, as set forth in said patent, and the distance between pins is regulated by an adjusting-screw, *n*, also as described in said patent; but this extensible rack *a*, instead of being fixed when in operation, is attached to a longitudinal reciprocating frame, *s*, which moves on suitable ways or guides *s′*.

To the under side of the frame *s* is secured a toothed rack, *b*, into which the pinion *b′* meshes, and from which it receives a reciprocating motion. This pinion is mounted on a crank-shaft, *d*, and the latter is operated by a crank, $d^1$. The power necessary to operate this crank is communicated through any desired line of gearing, P $P^1$ $P^2$ $P^3$, but so that a revolving crank, *p*, may, while revolving, impart not a revolving but an oscillatory motion through the connecting-rod *p′* to the crank $d^1$. This motion may be secured in different ways, though I consider that shown in the drawing to be probably the best. The gear-wheels $P^2$ and $P^3$ are eccentrically arranged on their axes, and the crank *p* is attached on the axis of the wheel $P^3$. With this arrangement, as the crank *p* makes one full revolution, it will cause the pinion *b′* to make a part revolution each way, imparting at one-half of its motion an advance motion to the rack-frame *s*, and at the other half a reverse motion.

At the advance motion one of the teeth of the rack *a* engages the pawl *c*, and carries forward the carriage and feed-table, with the plate to be punched properly secured thereon, any desired fixed distance. The reverse motion of the pinion and rack then begins, so as to bring the rack-frame *s* into position for beginning a new forward or feeding motion. During this motion the pawl *c* rises and slides over the teeth of the extensible frame, dropping into place after each tooth passes.

The distance between punch-holes is determined by the length of each feeding motion, and the latter is determined in part by the adjustment of the extensible rack *a*, as described in the patent above referred to, but is also further regulated by the use of the connecting-rod *p′* and the slotted cranks $d^1$ and *p*.

By adjusting the wrists which connect the ends of the rod *p′* with the slots *x* in said cranks in or out along said slots, the length of feed-motion given to the rack-frames *s* may be varied at pleasure, so that with each reverse motion the pawl $c$ may be made to pass one, two, or more teeth of the extensible rack $a$. Hence short changes in the distance between rivet-holes may be made by the adjustment of the extensible rack, while it will be found more convenient to provide for the greater changes by the adjustments of the wrists of the connecting-rod $p'$. For the purposes of this part of my invention, and as an element in the combination hereinafter claimed, any of the known forms or constructions of adjustable rack or rack-bars may be substituted for that shown at $a$.

At $e$ I have shown a punch-head, which may be of any desired construction, as also the die $d^2$, except that the latter is adjustable laterally and longitudinally by means of set-screws $d$, or in other equivalent way. The punch $e^1$ is attached eccentrically to the end of a stem or spindle, $e^2$, and the latter is inserted in the punch-head, so as to be rotated when desired, and thereby bring the punch to a different position. The gearing is so arranged that the punch does its work during the cessation of the feeding motion.

It is often desired to bevel the punched edge of the plate, as represented at $q$, Fig. 3, for greater convenience in calking or tightening the joints. This work I do at the same time with the punching by means of a shear, $i$, pivoted, as at $i^1$, and having a counterweighted stem, $i^2$. This shear is hung above the level of the face of the die $d^2$, so that in doing its work it will move in the arc of a circle and strike across the edge of the plate with an oblique stroke or beveling cut, and thereby cut the desired bevel, and in doing so the rear edge of the die $d^2$ constitutes its counter-shear. Hence the die $d^2$ is made adjustable, as described, so as to be brought to the proper point in the operation of shearing. The punch $e^1$ is then brought into line with the punch-hole in the die by rotating the stem or spindle $e^2$. The two being in line, the die $d^2$ is moved longitudinally, as may be necessary, so as to bring the punch-hole directly under the punch.

The cutting stroke of the shear is effected by the end or other part of the punch-head $e$ coming against the head or other part of the shear back of or above its cutting-edges, the punch preferably moving a little in advance of the shear, so as to catch and hold the plate firmly while the shearing is being done; and if a plate is not properly trimmed before the operation of punching is commenced, the shear may be likewise employed for doing such trimming.

The reverse movement of the shear is effected by the weighted stem or in other suitable way.

I claim herein as my invention—

1. The connecting-stem $p'$, having an adjustable crank-connection at each end, in combination with a rack and pinion, an extensible or adjustable rack, a feed-carriage, and pivoted table, substantially as set forth.

2. An extensible rack, $a$, in combination with a rack and pinion arranged to operate with alternate forward and reverse motions, substantially as set forth.

3. The combination of a punch, die, and beveling-shear, whereby the plate is prepared for calking at the same time that it is punched, substantially as set forth.

4. In a machine having an unobstructed line of feed for the progressive shearing of the edge of a sheet or plate, the combination of the fixed die $d$ and a beveling-shear, $i$, the latter having a rigid connection to a fixed center of motion above the level of the die, and being operative from such fixed center of motion across the edge of such die, substantially as set forth.

5. In combination with an adjustable die, $d^2$, a punch, $e^1$, connected with its die-head by an eccentric stem, substantially as set forth.

6. The combination of eccentric gear-wheels $P^2$ $P^3$, slotted cranks $p$ $d^1$, and stem $p'$, arranged substantially as set forth.

In testimony whereof I have hereunto set my hand.

JAMES MORGAN.

Witnesses:
C. L. PARKER,
J. J. MCCORMICK.